(12) United States Patent
Nakamaru et al.

(10) Patent No.: US 9,918,005 B2
(45) Date of Patent: Mar. 13, 2018

(54) FOCUSING CONTROL DEVICE, LENS DEVICE, IMAGING APPARATUS, FOCUSING CONTROL METHOD, AND FOCUSING CONTROL PROGRAM

(71) Applicant: FUJIFILM Corporation, Tokyo (JP)

(72) Inventors: Fumio Nakamaru, Saitama (JP); Kenshi Imamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/693,484

(22) Filed: Sep. 1, 2017

(65) Prior Publication Data

US 2017/0366740 A1 Dec. 21, 2017

Related U.S. Application Data

(63) Continuation of application No. PCT/JP2016/054320, filed on Feb. 15, 2016.

(30) Foreign Application Priority Data

Mar. 30, 2015 (JP) .................................. 2015-069165

(51) Int. Cl.
*H04N 5/232* (2006.01)
*G02B 7/02* (2006.01)
(Continued)

(52) U.S. Cl.
CPC ......... *H04N 5/23212* (2013.01); *G02B 7/028* (2013.01); *G02B 7/09* (2013.01); *G02B 7/365* (2013.01); *H04N 5/23296* (2013.01)

(58) Field of Classification Search
CPC ........... H04N 5/23212; H04N 5/23296; G02B 7/365; G02B 7/09; G02B 7/028
See application file for complete search history.

(56) References Cited

U.S. PATENT DOCUMENTS 5,614,983 A * 3/1997 Iwane ...................... G02B 7/28
396/133
6,268,885 B1 * 7/2001 Ohta ...................... G02B 7/102
348/335
(Continued)

FOREIGN PATENT DOCUMENTS

JP H11-038312 2/1999
JP 2005-091808 4/2005
(Continued)

OTHER PUBLICATIONS

"International Search Report (Form PCT/ISA/210) of PCT/JP2016/054320," dated Apr. 26, 2016, with English translation thereof, pp. 1-4.
(Continued)

*Primary Examiner* — Padma Haliyur
(74) *Attorney, Agent, or Firm* — JCIPRNET

(57) ABSTRACT

The focusing control device capable of preventing deterioration in precision of focusing control from being caused by an error in phase-difference depending on ambient temperature includes: an imaging element that outputs a pair of image signals deviated in one direction on the basis of one subject light image; a phase-difference detection section that detects a phase-difference between the pair of image signals; a temperature detection section; a correction section that corrects the in-focus position of the focus lens based on the detection phase-difference, which is the phase-difference detected by the phase-difference detection section, on the basis of the data in which the temperature, the focus lens position, and the information for in-focus position correction are associated with one another, the temperature which is detected by the temperature detection section, and the focus lens position; and a lens control section that moves the focus lens to the corrected in-focus position.

20 Claims, 6 Drawing Sheets

(51) Int. Cl.
*G02B 7/09* (2006.01)
*G02B 7/36* (2006.01)

(56) References Cited

U.S. PATENT DOCUMENTS

| | | | |
|---|---|---|---|
| 6,363,220 B1 * | 3/2002 | Ide | G02B 7/08 |
| | | | 348/345 |
| 7,414,231 B2 * | 8/2008 | Fukui | G02B 7/343 |
| | | | 250/201.2 |
| 7,872,684 B2 * | 1/2011 | Nakano | G02B 7/102 |
| | | | 348/345 |
| 8,781,313 B2 | 7/2014 | Uchiyama | |
| 8,952,306 B2 * | 2/2015 | Yoshida | G02B 7/28 |
| | | | 250/201.4 |
| 2005/0063694 A1 | 3/2005 | Nakazawa | |
| 2009/0296050 A1 | 12/2009 | Ishida | |
| 2011/0095166 A1 | 4/2011 | Yoshida | |

FOREIGN PATENT DOCUMENTS

| | | |
|---|---|---|
| JP | 2009-288610 | 12/2009 |
| JP | 2010-039373 | 2/2010 |
| JP | 2011-090177 | 5/2011 |
| JP | 2012-068365 | 4/2012 |
| JP | 2013-083717 | 5/2013 |
| JP | 2013-242353 | 12/2013 |
| JP | 2014-219643 | 11/2014 |

OTHER PUBLICATIONS

"International Preliminary Report on Patentability (Form PCT/IPEA/409) of PCT/JP2016/054320," dated Feb. 22, 2017, with English translation thereof, pp. 1-6.

* cited by examiner

| ZOOM | FOCUS LENS POSITION (X) | | | |
|---|---|---|---|---|
| MAGNIFICATION | 600mm | 700mm | ... | INF |
| 1 | a,b | a,b | | a,b |
| 1.1 | a,b | a,b | | a,b |
| 1.2 | a,b | a,b | | a,b |
| ... | | | | |
| 20 | a,b | a,b | | a,b |

FOCUSING CONTROL DEVICE, LENS DEVICE, IMAGING APPARATUS, FOCUSING CONTROL METHOD, AND FOCUSING CONTROL PROGRAM

CROSS-REFERENCE TO RELATED APPLICATIONS

This application is a Continuation of PCT International Application No. PCT/JP2016/054320 filed on Feb. 15, 2016, which claims priority under 35 U.S.C §119(a) to Japanese Patent Application No. 2015-069165 filed on Mar. 30, 2015. Each of the above application(s) is hereby expressly incorporated by reference, in its entirety, into the present application.

BACKGROUND OF THE INVENTION

1. Field of the Invention

The present invention relates to a focusing control device, a lens device, an imaging apparatus, a focusing control method, and a focusing control program.

2. Description of the Related Art

Recently, there has been a rapid increase in the demand for information devices of digital still cameras, digital video cameras, mobile phones such as smartphones having imaging functions, in accordance with an increase in resolution of imaging elements such as charge coupled device (CCD) image sensors and complementary metal oxide semiconductor (CMOS) image sensors. It should be noted that information devices having the above-mentioned imaging functions are referred to as imaging apparatuses.

In these imaging apparatuses, as a focusing control method for focusing on a main subject, a phase difference auto focus (AF) method (for example, refer to JP2011-090177A, JP2013-242353A, and JP2014-219643A) is adopted.

JP2011-090177A discloses an imaging apparatus comprising: a focus lens; an imaging element for capturing an image of a subject through the focus lens; and a phase difference detection element that detects a phase difference as an amount of image deviation between two images on the basis of a part of rays traveling toward the imaging element through the focus lens.

In the imaging apparatus, in consideration of change in flange focal length indicating a distance from a lens device to an imaging element caused by a temperature, temperature correction is applied to an amount of defocus converted from a phase difference.

JP2013-242353A discloses an imaging apparatus that drives a focus lens on the basis of a phase difference detected using an imaging element which includes phase difference detection pixels. In the description of JP2013-242353A, in consideration of change in flange focal length increased or decreased by temperature change, this change is corrected on the basis of the temperature.

JP2014-219643A discloses an imaging apparatus comprising: a focus lens; an imaging element for capturing an image of a subject through the focus lens; and a phase difference detection element that detects a phase difference as an amount of image deviation between two images on the basis of a part of rays traveling toward the imaging element through the focus lens. In the description of the imaging apparatus, there is no description about correction of an amount of driving of the focus lens in which the temperature is considered.

SUMMARY OF THE INVENTION

The imaging apparatus configured as described in JP2011-090177A and JP2014-219643A comprises a focus lens, an imaging element, and a phase difference detection element that detects a phase difference as an amount of image deviation between two images on the basis of a part of rays traveling toward the imaging element through the focus lens. In such a configuration, an optical system such as a separator lens for separating a subject image into two images may be disposed in front for the phase difference detection element.

In such a case, there may be a difference between temperature characteristics of the focus lens and the optical system in front of the phase difference detection element. Due to the difference, even in a case where the position of the focus lens at the time of detecting the phase difference is the same, the detected phase difference becomes different in accordance with the ambient temperature of the imaging apparatus.

In JP2011-090177A, JP2013-242353A, and JP2014-219643A, there is no idea about the problem that the phase difference varies depending on the temperature.

In the description of JP2011-090177A, the flange focal length changes with the temperature. However, the phase difference detection element performs phase difference detection including detection of the change in flange focal length, and thus an error does not occur in the phase difference.

In JP2011-090177A, since an amount of defocus converted from the detected phase difference includes an error caused by an amount of change in flange focal length, the error is corrected. Thus, correction for the error included in the phase difference is not considered.

In the imaging apparatus described in JP2013-242353A, the focus lens is driven on the basis of the phase difference which is detected using the imaging element including the phase difference detection pixels. Thus, this configuration does not cause the above-mentioned problem.

In JP2014-219643A, there is no description about correction for the phase difference in which the temperature is considered.

In the above description, the phase difference changes depending on the temperature. However, in a case where an error occurs in the phase difference, the in-focus position of the focus lens based on the phase difference also includes an error.

The present invention has been made in consideration of the above-mentioned situation, and its object is to provide a focusing control device capable of preventing deterioration in precision of focusing control from being caused by an error in phase difference depending on ambient temperature, a lens device including the focusing control device, an imaging apparatus including the focusing control device, a focusing control method, and a focusing control program.

A focusing control device of the present invention, included in a lens device which is used with a camera device, comprises: a sensor that outputs a pair of image signals deviated in one direction on the basis of one subject light image; a phase difference detection section that detects a phase difference between the pair of image signals which are output from the sensor; an optical element that guides a part of subject light, which is incident into an imaging optical system including a focus lens, into an imaging element which captures a subject light image through the imaging optical system, and guides the other part of the subject light into the sensor; an optical system that is provided between the optical element and the sensor; a temperature detection section that detects a temperature; a focus lens position detection section that detects a position of the focus lens; a storage section that stores data in which the temperature, the position of the focus lens, and information for in-focus position correction are associated with one another; a correction section that corrects the in-focus position of the focus lens based on the detection phase difference, which is the phase difference detected by the phase difference detection section, on the basis of the data which is stored in the storage section, the temperature which is detected by the temperature detection section, and the position of the focus lens which is detected by the focus lens position detection section; and a lens control section that moves the focus lens to the in-focus position which is corrected by the correction section.

A lens device of the present invention comprises: the focusing control device; and the imaging optical system.

An imaging apparatus of the present invention comprises: the focusing control device; and the imaging element.

A focusing control method of the present invention is performed by a focusing control device included in a lens device which is used with a camera device. The focusing device includes a sensor that outputs a pair of image signals deviated in one direction on the basis of one subject light image, an optical element that guides a part of subject light, which is incident into an imaging optical system including a focus lens, into an imaging element which captures a subject light image through the imaging optical system, and guides the other part of the subject light into the sensor, an optical system that is provided between the optical element and the sensor, a temperature detection section that detects a temperature, and a storage section that stores data in which the temperature, the position of the focus lens, and information for in-focus position correction are associated with one another. The focusing control method comprises: a phase difference detection step of detecting a phase difference between the pair of image signals which are output from the sensor; a focus lens position detection step of detecting a position of the focus lens; a correction step of correcting the in-focus position of the focus lens based on the detection phase difference, which is the phase difference detected in the phase difference detection step, on the basis of the data which is stored in the storage section, the temperature which is detected by the temperature detection section, and the position of the focus lens which is detected in the focus lens position detection step; and a lens control step of moving the focus lens to the in-focus position which is corrected in the correction step.

A non-transitory computer readable recording medium storing a focusing control program of the present invention is for performing focusing control for the focus lens through a focusing control device included in a lens device which is used with a camera device. The focusing control device includes a sensor that outputs a pair of image signals deviated in one direction on the basis of one subject light image, an optical element that guides a part of subject light, which is incident into an imaging optical system including a focus lens, into an imaging element which captures a subject light image through the imaging optical system, and guides the other part of the subject light into the sensor, an optical system that is provided between the optical element and the sensor, a temperature detection section that detects a temperature, and a storage section that stores data in which the temperature, the position of the focus lens, and information for in-focus position correction are associated with one another. The stored focusing control program causes a computer to execute: a phase difference detection step of detecting a phase difference between the pair of image signals which are output from the sensor; a focus lens position detection step of detecting a position of the focus lens; a correction step of correcting the in-focus position of the focus lens based on the detection phase difference, which is the phase difference detected in the phase difference detection step, on the basis of the data which is stored in the storage section, the temperature which is detected by the temperature detection section, and the position of the focus lens which is detected in the focus lens position detection step; and a lens control step of moving the focus lens to the in-focus position which is corrected in the correction step.

According to the present invention, it is possible to provide a focusing control device capable of preventing deterioration in precision of focusing control from being caused by an error in phase difference depending on ambient temperature, a lens device including the focusing control device, an imaging apparatus including the lens device, a focusing control method, and a focusing control program.

DESCRIPTION OF THE PREFERRED EMBODIMENTS

Hereinafter, embodiments of the present invention will be described with reference to drawings.

Figure 1:
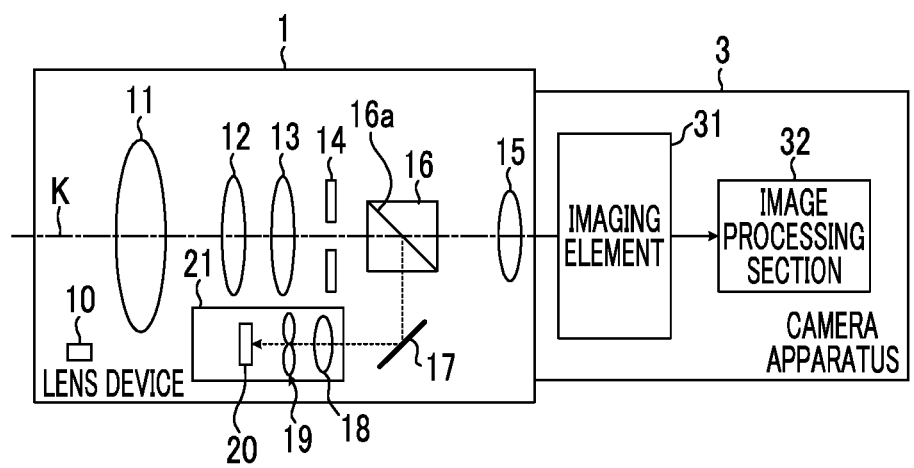
FIG. 1 is a diagram illustrating a schematic configuration of a camera system for explaining an embodiment of the present invention.

FIG. 1 is a diagram illustrating a schematic configuration of a camera system for explaining an embodiment of the present invention. The camera system is appropriate for camera systems for business such as broadcasting and movie use.

The camera system shown in FIG. 1 comprises a lens device 1, and a camera apparatus 3 as an imaging apparatus which is mounted on the lens device 1.

The lens device 1 comprises a focus lens 11, zoom lenses 12 and 13 for changing a focal length, a stop 14, and a master lens group 15, and those are arranged in order from the subject side.

The focus lens 11, the zoom lenses 12 and 13, the stop 14, and the master lens group 15 constitutes an imaging optical system. The imaging optical system includes at least focus lens 11.

The focus lens 11 is a lens for adjusting focus of the imaging optical system, and is formed of a single lens or a plurality of lenses. The focus lens 11 performs the focus adjustment by moving in a direction of an optical axis K of the imaging optical system.

The lens device 1 further comprises a beam splitter 16 that includes a reflective surface 16a, a mirror 17, an AF unit 21 that includes a condensing lens 18, a separator lens 19, and imaging element 20, and a temperature detection section 10.

The beam splitter 16 is disposed on the optical axis K between the stop 14 and the master lens group 15.

The beam splitter 16 intactly transmits a part (for example, 80% of the subject light) of subject light, which is incident into the imaging optical system and passes through the stop 14, and reflects the other part (for example, 20% of the subject light) of the subject light from the reflective surface 16a in a direction orthogonal to the optical axis K.

A position of the beam splitter 16 is not limited to the position shown in FIG. 1, and may be set after the lens which is closest to the subject side of the imaging optical system on the optical axis K.

The mirror 17 is disposed on an optical path of the light reflected by the reflective surface 16a of the beam splitter 16, and reflects the light such that the light is incident onto the condensing lens 18 of the AF unit 21.

The condensing lens 18 condenses the light reflected by the mirror 17.

The separator lens 19 is formed of two lenses arranged in one direction.

The subject light, which is condensed by the condensing lens 18, passes through each of the two lenses, and forms images at different positions on light receiving surface (a surface on which a plurality of pixels is disposed) of the imaging element 20. Consequently, a pair of the subject light images deviated in one direction is formed on the light receiving surface of the imaging element 20.

The beam splitter 16 and mirror 17 functions as an optical element that causes a part of the subject light, which is incident into the imaging optical system, to be incident into an imaging element 31 of the camera apparatus 3 that captures the subject light images through the imaging optical system, and that causes the other part of the subject light to be incident into the imaging element 20. It should be noted that a configuration, in which the mirror 17 is removed and the light reflected by the beam splitter 16 is caused to be directly incident onto the condensing lens 18, may be adopted.

The condensing lens 18 and the separator lens 19 constitutes an optical system that is provided between the optical element and the imaging element 20.

The imaging element 20 is an area sensor in which the plurality of pixels is two-dimensionally disposed on the light receiving surface, and outputs image signals respectively corresponding to the two subject light images formed on the light receiving surface. That is, the imaging element 20 is a sensor that outputs a pair of image signals deviated in one direction on the basis of one subject light image formed by the imaging optical system. By using the area sensor as the imaging element 20, it is possible to avoid the difficulty of precisely matching positions of the line sensors as compared with a configuration using two line sensors.

The temperature detection section 10 detects an ambient temperature of environment in which the imaging optical system including the lens device 1 and the optical system formed of the condensing lens 18 and the separator lens 19 are placed, and a known temperature sensor is used therein.

The camera apparatus 3 comprises the imaging element 31 such as a CCD image sensor or a CMOS image sensor disposed on the optical axis K of the lens device 1, and an image processing section 32 that generates captured image data by processing the image signals which are obtained by capturing the subject light images through the imaging element 31.

Figure 2:
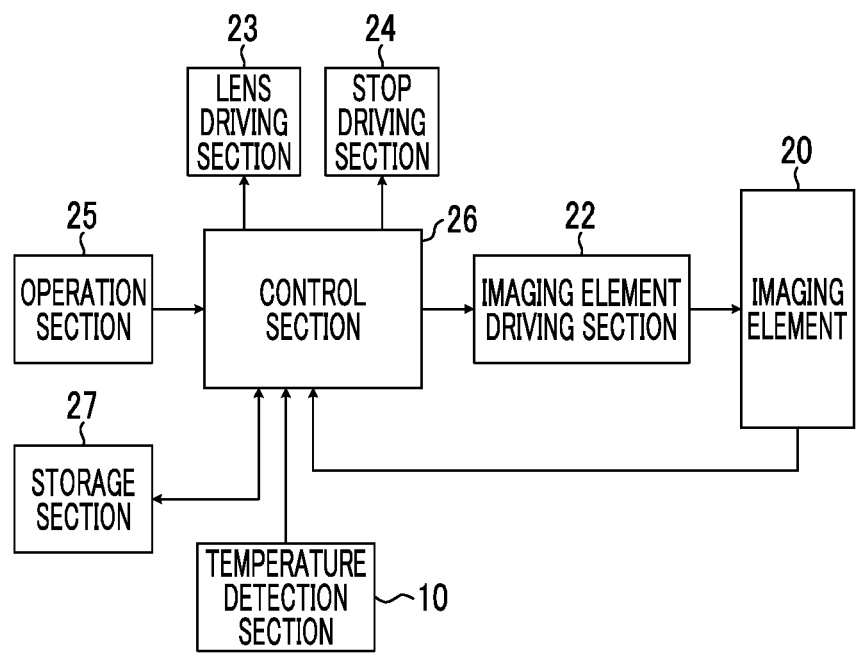
FIG. 2 is a block diagram illustrating an internal configuration of a lens device 1 shown in FIG. 1.

FIG. 2 is a block diagram illustrating an internal configuration of the lens device 1 shown in FIG. 1.

The lens device 1 comprises not only the elements described in FIG. 1, but also an imaging element driving section 22, a lens driving section 23, a stop driving section 24, an operation section 25, a control section 26 that integrally controls the entire system, and a storage section 27.

The imaging element driving section 22 drives the imaging element 20 in accordance with a command of the control section 26.

The lens driving section 23 performs focus adjustment by driving the focus lens 11 in the direction of the optical axis K in accordance with the command of the control section 26, or changes a zoom magnification by driving the zoom lenses 12 and 13 in the direction of the optical axis K.

The stop driving section 24 adjusts an exposure amount by controlling an aperture amount of the stop 14 in accordance with the command of the control section 26.

In addition, the lens device 1 comprises a zoom ring, a focus ring, and a stop ring which are not shown in the drawing. The zoom ring is for manually changing the positions of the zoom lenses 12 and 13 in the direction of the optical axis K. The focus ring is for manually changing the position of the focus lens 11 in the direction of the optical axis K. The stop ring is for manually changing the aperture amount of the stop 14.

The operation section 25 is a user interface for inputting a command signal to the control section 26. The operation section 25 includes a button, which is for changing mode setting, and the like.

Figures 3, 4:
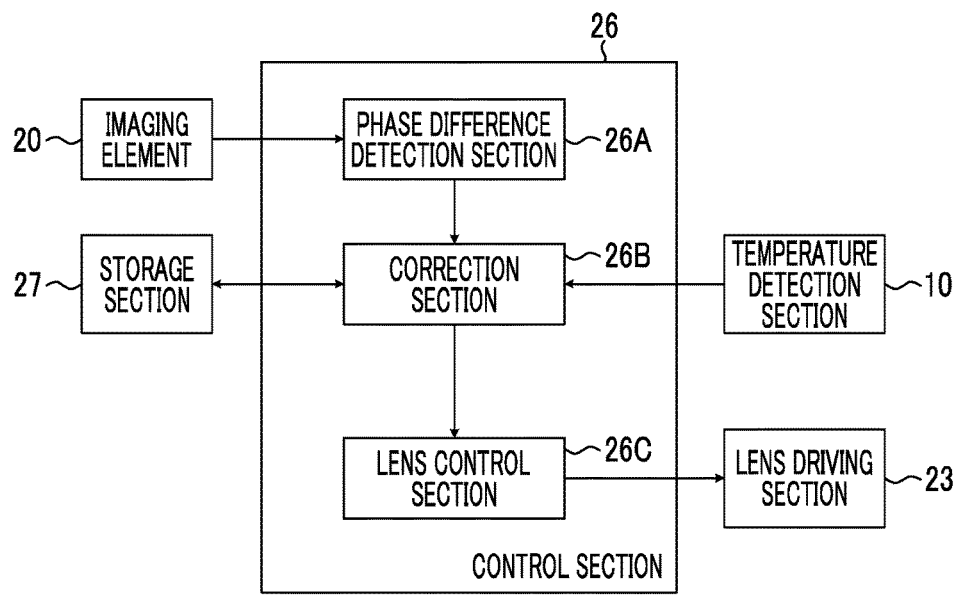
FIG. 3 is a diagram illustrating functional blocks of a control section 26 shown in FIG. 2.
FIG. 4 is a diagram illustrating an example of data stored in a storage section 27.

FIG. 3 is a diagram illustrating functional blocks of the control section 26 shown in FIG. 2. The functional blocks are configured such that a processor included in the control section 26 executes a focusing control program.

The control section 26 comprises a phase difference detection section 26A, a correction section 26B, and a lens control section 26C.

The phase difference detection section 26A detects a phase difference (phase difference between two image signals deviated in one direction) of a pair of image signals which are output from the imaging element 20.

The storage section 27 stores data in which the temperature, the position of the focus lens 11 (hereinafter referred to as a focus lens position), the zoom magnification determined by the positions of the zoom lenses 12 and 13, and the information for in-focus position correction are associated with one another.

The information for in-focus position correction is information (hereinafter referred to as an amount of correction for the phase difference) for correcting the phase difference between the pair of image signals which are output from the imaging element 20.

In a case where the phase difference is corrected, the position (in-focus position) of the focus lens 11 moved on the basis of the corrected phase difference is also corrected.

Consequently, the amount of correction for the phase difference is the information for in-focus position correction.

The phase difference, which is detected by the phase difference detection section 26A, changes depending on each of the focus lens position, the zoom magnification, and the temperature.

The storage section 27 stores the amount of correction for the phase difference depending on the temperature, the focus lens position, and the zoom magnification.

FIG. 4 is a diagram illustrating an example of the data stored in the storage section 27. The data shown in FIG. 4 is, for example, data in a case where the ambient temperature of environment in which the lens device 1 is placed is 25° C., and the data is stored multiple times at intervals of 5° C., for example.

In a table shown in FIG. 4, for each combination of a focus lens position X (physical position from the origin which is a position INF corresponding to the infinity) and the zoom magnification, coefficients a and b specific to the combination are stored.

The amount of correction for the phase difference Y is stored in the storage section 27 in a form of a linear function (Y=a×X+b) using the focus lens position X as a variable.

The coefficients do not have to be stored for each combination. The coefficients are stored only for representative combinations, and coefficients may be interpolated and generated by performing linear interpolation on the basis of the stored coefficients, for combinations for which coefficients are not stored.

Alternatively, coefficients, which correspond to a combination closest to the combination where the coefficients are not stored among the combinations for which the coefficients are stored, may be used as the coefficients of the combinations for which the coefficients are not stored.

Returning to the description of FIG. 3, the correction section 26B generates the detected amount of correction for the phase difference, which is the phase difference detected by the phase difference detection section 26A, on the basis of the data stored in the storage section 27, the temperature detected by the temperature detection section 10, the current focus lens position, and the zoom magnification defined by the positions of the zoom lenses 12 and 13. The correction section 26B corrects the detection phase difference by using the generated amount of correction. In other words, the correction section 26B corrects the detection phase difference, thereby correcting the in-focus position based on the detection phase difference.

Although not shown in FIG. 3, the control section 26 also functions as a focus lens position detection section, which detects the current focus lens position, and as a zoom magnification detection section which detects the current zoom magnification.

The lens control section 26C moves the focus lens so as to set the detection phase difference to zero, in accordance with the detection phase difference which is corrected by the correction section 26B, through the lens driving section 23. In other words, the lens control section 26C moves the focus lens 11 to the in-focus position which is corrected by the correction section 26B.

Figure 5:
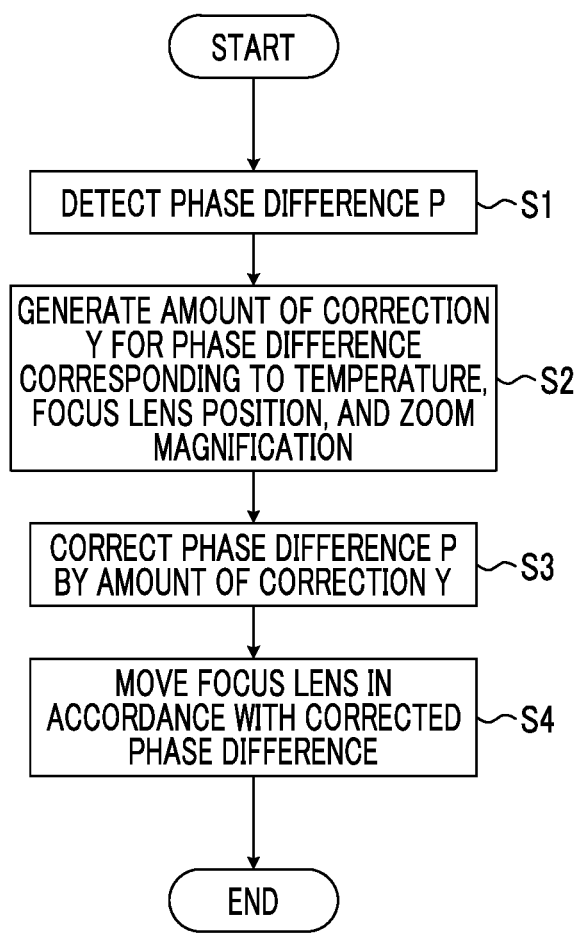
FIG. 5 is a flowchart illustrating an AF operation of the camera system shown in FIG. 1.

FIG. 5 is a flowchart illustrating an AF operation of the camera system shown in FIG. 1.

The phase difference detection section 26A acquires the captured image signals which are output from the imaging element 20, and detects the phase difference P on the basis of the acquired captured image signals (step S1).

Next, the correction section 26B acquires information about the temperature detected by the temperature detection section 10, the information about the current focus lens position, and the information about the current zoom magnification, and generates an amount of correction Y, which corresponds to the combination of the acquired information pieces, on the basis of the acquired information and the data stored in the storage section 27 (step S2).

In a case where the coefficients corresponding to the combination of the acquired information pieces are stored in the storage section 27, the correction section 26B intactly reads out the coefficients, and calculates Y=a×X+b, thereby generating the amount of correction Y.

In a case where the coefficients are not stored in the storage section 27, the correction section 26B generates the coefficients through linear interpolation, and calculates Y=a×X+b on the basis of the generated coefficients, thereby generating the amount of correction Y.

In the example of FIG. 1, the amounts of correction for the phase difference, which are included in the data stored in the storage section 27, are stored in a form of coefficients of a linear function, but the amounts of correction for the phase difference can be stored as raw values in the storage section 27. In this case, in a case where the amount of correction corresponding to the combination of the acquired information pieces is stored in the storage section 27, the correction section 26B intactly reads out and acquires the amount of correction, thereby generating the amount of correction Y.

Further, in a case where the amount of correction corresponding to the combination of the acquired information pieces is not stored in the storage section 27, the correction section 26B generates the amount of correction Y through linear interpolation on the basis of the amount of correction which corresponds to a combination closest to the combination and is stored in the storage section 27.

After the amount of correction Y is generated, the correction section 26B corrects the phase difference P by using the generated amount of correction Y (step S3). For example, the amount of correction Y is subtracted from the phase difference P. Through the correction, the in-focus position based on the uncorrected phase difference P is corrected.

After the phase difference P is corrected, the lens control section 26C calculates an amount of driving (an amount of driving for setting the corrected phase difference P to zero) of the focus lens 11 corresponding to the corrected phase difference P, and moves the focus lens 11 in accordance with the calculated amount of driving (step S4).

Thereby, the focus lens 11 moves to the in-focus position (the in-focus position corrected in step S3) based on the corrected phase difference P.

As described above, according to the camera system of FIG. 1, the detection phase difference is corrected using the amount of correction corresponding to the temperature, the focus lens position, and the zoom magnification, and moves the focus lens 11 to the in-focus position based on the corrected detection phase difference. Therefore, it is possible to perform focusing control in a state where the error in the detection phase difference depending on the temperature, the focus lens position, and the zoom magnification is reduced, and it is possible to enhance precision in focusing.

In addition, a contrast AF method is also known as a focusing control method for focusing on a main subject. In the contrast AF method, the focus lens position, at which the contrast evaluation value becomes maximum while moving the focus lens, is determined as the in-focus position, and then the focus lens is moved to the in-focus position.

That is, since the in-focus position is determined in consideration of the temperature and the zoom magnification during the AF operation, there is no concept of correcting the in-focus position on the basis of the temperature and the zoom magnification.

Further, in the contrast AF method, it is necessary to determine the in-focus position by moving the focus lens. Therefore, for example, in a case where the contrast evaluation value is corrected for each focus lens position, the throughput increases, and high-speed AF cannot be performed. According to the camera system of the present embodiment, it becomes possible to perform focusing control at high speed and with high precision.

Figure 6:
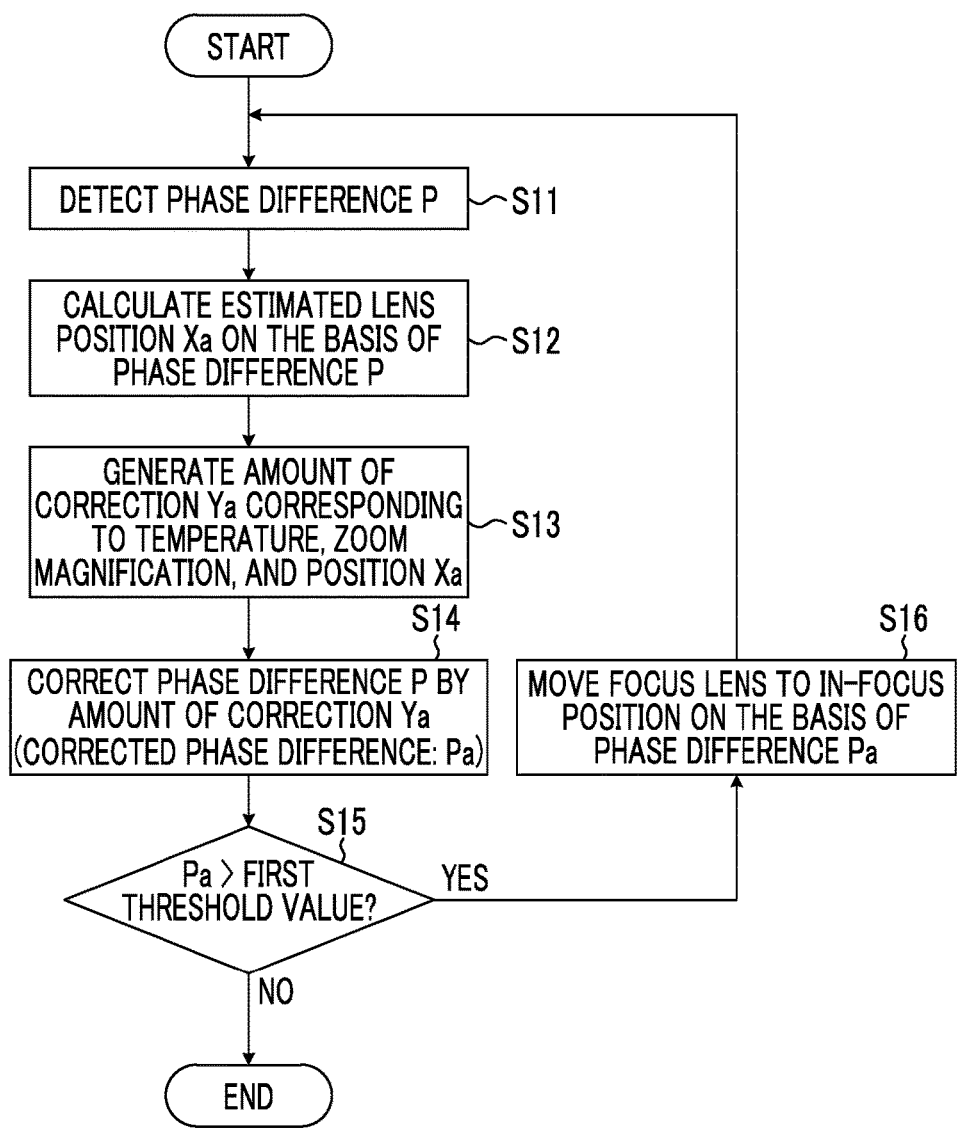
FIG. 6 is a flowchart illustrating an AF operation of the camera system shown in FIG. 1.

FIG. 6 is a flowchart illustrating a first modification example of the AF operation of the camera system shown in FIG. 1.

The phase difference detection section 26A acquires the captured image signals which are output from the imaging element 20, and detects the phase difference P on the basis of the acquired captured image signals (step S11).

Next, the correction section 26B calculates an estimated lens position Xa which is the position of the focus lens 11 in a state where the focus lens 11 is moved from the current position in accordance with the phase difference P (step S12).

Next, the correction section 26B generates an amount of correction Ya, which corresponds to a combination of the information about the current zoom magnification, the information about the temperature detected by the temperature detection section 10, and the estimated lens position Xa calculated in step S12, on the basis of the data stored in the storage section 27 (step S13).

Next, the correction section 26B corrects the phase difference P by the amount of correction Ya (step S14). Here, the corrected phase difference is set as the phase difference Pa.

Subsequently, the lens control section 26C determines whether or not the phase difference Pa is greater than a first threshold value (step S15). In a case where the result of the determination in step S15 is YES, the lens control section 26C moves the focus lens 11 to the in-focus position based on the phase difference Pa (step S16), and returns the processing to step S11.

In a case where the result of the determination in step S15 is NO, the corrected phase difference is approximate to zero, and the focus lens 11 is present in the vicinity of the in-focus position. Therefore, in the case where the result of the determination in step S15 is NO, the AF operation ends.

According to the first modification example, the focus lens 11 can be brought close to a real in-focus position little by little. Therefore, it is possible to suppress the phenomenon that the focus lens 11 moves back and forth across the real in-focus position, and thus it is possible to perform smooth focusing control.

Figure 7:
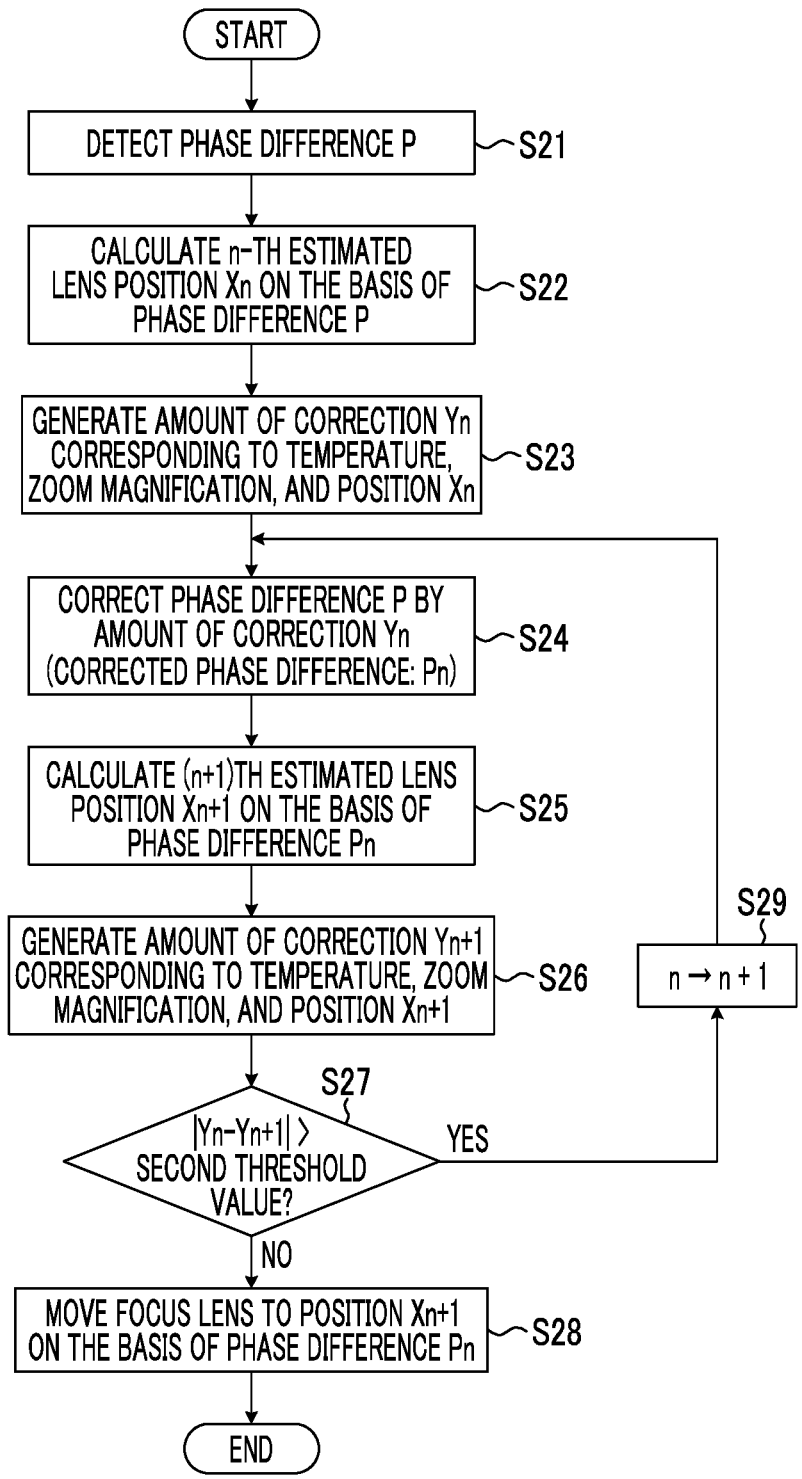
FIG. 7 is a flowchart illustrating a second modification example of the AF operation of the camera system shown in FIG. 1.

FIG. 7 is a flowchart illustrating a second modification example of the AF operation of the camera system shown in FIG. 1.

The phase difference detection section 26A acquires the captured image signals which are output from the imaging element 20, and detects the phase difference P on the basis of the acquired captured image signals (step S21).

Figure 8:
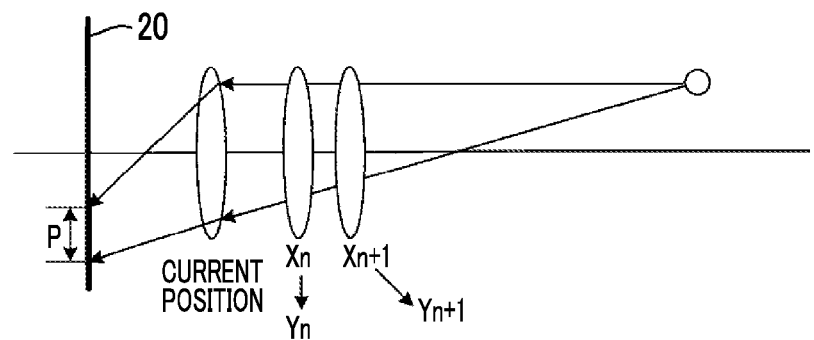
FIG. 8 is a diagram illustrating an operation of the second modification example.

Next, the correction section 26B calculates an n-th estimated lens position Xn (n is a natural number of 1 or more, and an initial value is 1) which is a position of the focus lens 11 in a state where the focus lens 11 is moved from the current position in accordance with the phase difference P (step S22). FIG. 8 shows a diagram in which the focus lens 11 is moved from the current focus lens position to the estimated lens position Xn.

Subsequently, the correction section 26B generates an amount of correction Yn, which corresponds to a combination of the information about the current zoom magnification, the information about the temperature detected by the temperature detection section 10, and the estimated lens position Xn calculated in step S22, on the basis of the data stored in the storage section 27 (step S23). Step S23 constitutes first processing.

Next, the correction section 26B corrects the phase difference P by the amount of correction Yn (step S24). Here, the corrected phase difference is set as the phase difference Pn.

Subsequently, the correction section 26B calculates an (n+1)th estimated lens position Xn+1 which is a position of the focus lens 11 in a state where the focus lens 11 is moved from the current position in accordance with the phase difference Pn (step S25). FIG. 8 shows a diagram in which the focus lens 11 is moved from the current focus lens position to the estimated lens position Xn+1.

Then, the correction section 26B generates an amount of correction Yn+1, which corresponds to a combination of the information about the current zoom magnification, the information about the temperature detected by the temperature detection section 10, and the estimated lens position Xn+1 calculated in step S25, on the basis of the data stored in the storage section 27 (step S26). Steps S25 and S26 constitute second processing.

Next, the lens control section 26C calculates an absolute value of a difference between the amount of correction Yn and the amount of correction Yn+1, and determines whether or not the absolute value is greater than a second threshold value (step S27). In a case where the result of the determination in step S27 is YES, the lens control section 26C changes n to n+1, and the processing returns to the step S24.

In a case where the result of the determination in step S27 is NO, the lens control section 26C moves the focus lens 11 to the estimated lens position Xn+1 based on the phase difference Pn which is generated in step S24 (step S28), and the AF operation ends.

The phase difference P detected in step S21 can be represented by Expression (1) as a sum of a real phase difference component Pt and an error component Pe.

$$P = Pt + Pe \quad (1)$$

Further, the corrected phase difference Pn, which is obtained by correcting the phase difference P with the correction amount Yn, is represented by Expression (2).

$$Pn = Pt + Pe - Yn \quad (2)$$

In a case where "Pe-Yn" of Expression (2) is zero, the phase difference Pn has a correct value. However, the correction amount Yn is not an amount of correction corresponding to the current focus lens position, but an amount of correction corresponding to the estimated lens position Xn. The estimated lens position Xn is determined on the basis of the phase difference P, and the phase difference P includes the error component Pe as shown in Expression (1). Accordingly, the amount of correction Yn may not coincide with the error component Pe.

Therefore, the correction section 26B further generates an amount of correction Yn+1. The corrected phase difference Pn+1, which is obtained by correcting the phase difference P with the amount of correction Yn+1, is represented by Expression (3).

$$Pn+1 = Pt + Pe - Yn+1 \quad (3)$$

In a case where Expressions (2) substantially coincide with Expression (3), that is, in a case where the amount of correction Yn is substantially equal to the amount of correction Yn+1, it can be determined that both the amount of correction Yn and the amount of correction Yn+1 have high reliabilities. Therefore, in a case where the result of the determination in step S27 is NO, the lens control section 26C moves the focus lens 11 to the estimated lens position Xn+1 based on the phase difference Pn.

In contrast, in a case where the result of the determination in step S27 is YES, there is a high possibility that there is an error in either the amount of correction Yn or the amount of correction Yn+1. In this case, until it is determined that the reliabilities of the amount of correction Yn and the amount of correction Yn+1 are high, the processing from step S24 to step S27 is repeated.

According to the second modification example, it is possible to correct the phase difference in accordance with the amount of correction for the phase difference having a high reliability, and it is possible to further improve precision in focusing.

In step S28 of FIG. 7, instead of moving the focus lens 11 to the estimated lens position Xn+1 based on the phase difference Pn, the focus lens 11 may be moved to the (n+2)th estimated lens position Xn+2 based on the phase difference Pn+1 obtained by correcting the phase difference P with the amount of correction Yn+1. Since the amount of correction Yn and the amount of correction Yn+1 have substantially the same values, focusing control with high precision can be performed by either method.

The amount of correction Y stored in the storage section 27 is a design value which is determined for each model of the lens device 1. Actually, there are individual differences for each model, and the amount of correction may be different even for the same model.

Therefore, the storage section 27 stores an error (hereinafter also referred to as an offset value) from the actual measurement value of the amount of correction Y in association with the amount of correction Y.

For example, a designed amount of correction Y, which corresponds to an arbitrary temperature, an arbitrary position of the focus lens 11, and an arbitrary zoom magnification, is stored in association with an amount of correction for the phase difference actually calculated by the lens device 1 under conditions of a reference temperature, a reference position of the focus lens 11, and a reference zoom magnification.

In step S2 of FIG. 5, the correction section 26B adds the offset value to the designed amount of correction calculated from coefficients corresponding to the temperature, the position of the focus lens 11, and the zoom magnification, thereby generating an amount of correction Y.

Similarly in step S13 of FIG. 6, the correction section 26B adds the offset value to the amount of correction Y calculated from the coefficients corresponding to the temperature, the zoom magnification, and the estimated lens position Xa, thereby generating an amount of correction, which is obtained after the addition, as the amount of correction Ya.

Similarly in step S23 of FIG. 7, the correction section 26B adds the offset value to the amount of correction Y calculated from the coefficients corresponding to the temperature, the zoom magnification, and the estimated lens position Xn, thereby generating an amount of correction, which is obtained after the addition, as the amount of correction Yn.

Similarly in step S26 of FIG. 7, the correction section 26B adds the offset value to the amount of correction Y calculated from the coefficients corresponding to the temperature, the zoom magnification, and the estimated lens position Xn+1, thereby generating an amount of correction, which is obtained after the addition, as the amount of correction Yn+1.

As described above, the error between the design value of the amount of correction for the phase difference and the actual measurement value is stored as the offset value in the storage section 27. Thereby, it is possible to more precisely correct the phase difference. As a result, it is possible to enhance precision in focusing control.

It should be noted that one offset value is stored as a value corresponding to the reference temperature, the reference focus lens position, and the reference zoom magnification. The offset value may be calculated for each of a plurality of patterns of reference conditions in which the reference temperature, the reference focus lens position, and the reference zoom magnification have different values, and may be stored in the storage section 27.

In this case, the amounts of correction Y stored in the storage section 27 may be divided into some groups, and each group may be stored in association with an offset value for reference conditions close to the temperature, the focus lens position, and the zoom magnification corresponding to the group.

In the above description, the information for in-focus position correction was set as the amount of correction for the phase difference. However, the information for in-focus position correction may be set as an amount of correction for the amount of driving (amount of driving of the focus lens 11 necessary for setting the phase difference to zero) of the focus lens 11 corresponding to the phase difference. In a case where the amount of driving is corrected, the position (in-focus position) of the focus lens 11 moved in accordance with the corrected amount of driving is also corrected. Consequently, the amount of correction for the amount of driving is the information for in-focus position correction.

Further, in the above description, the amounts of correction Y stored in the storage section 27 were set to correspond to the combinations of the temperature, the focus lens position, and the zoom magnification. Some camera systems have no zoom functions. Therefore, the storage section 27 may be configured to store the amounts of correction Y corresponding to combinations of the temperature and the focus lens position.

In this case, in step S2 of FIG. 5, the correction section 26B generates the amount of correction Y corresponding to the temperature and the focus lens position. In step S13 of FIG. 6, the correction section 26B generates the amount of correction Ya corresponding to the temperature and the estimated lens position Xa. In step S23 of FIG. 7, the correction section 26B generates the amount of correction Yn corresponding to the temperature and the estimated lens position Xn. In step S26 of FIG. 7, the correction section 26B generates the amount of correction Yn+1 corresponding to the temperature and the estimated lens position Xn+1.

The temperature detection section 10, the beam splitter 16, the mirror 17, the condensing lens 18, the separator lens 19, the imaging element 20, and the control section 26 in the above-mentioned lens device 1 constitute a focusing control device.

In the camera system of FIG. 1, the focusing control device is provided in the lens device 1, but the camera apparatus 3 may be configured to have the focusing control device.

Figure 9:
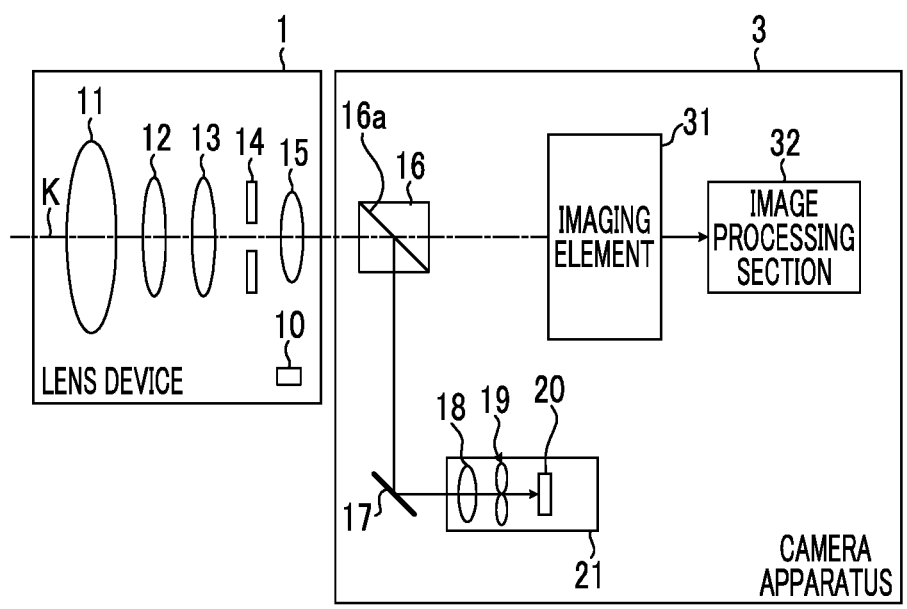
FIG. 9 is a diagram illustrating a configuration example of a camera system in which a focusing control device is built into a camera apparatus.

FIG. 9 is a diagram illustrating a configuration example of a camera system in which a focusing control device is built into a camera apparatus.

In the camera system shown in FIG. 9, the lens device 1 comprises the lens driving section 23 and the stop driving section 24 shown in FIG. 2, and the lens device 1 and the focusing control device built into the camera apparatus 3 is configured to be able to communicate with each other. The camera system shown in FIG. 9 can be applied to both a digital camera, in which the lens device is interchangeable, and a digital camera in which the lens device is integrated.

As described above, the present description discloses the following items.

A disclosed focusing control device, included in a lens device which is used with a camera device, comprises: a sensor that outputs a pair of image signals deviated in one direction on the basis of one subject light image; a phase difference detection section that detects a phase difference between the pair of image signals which are output from the sensor; an optical element that guides a part of subject light, which is incident into an imaging optical system including a focus lens, into an imaging element which captures a subject light image through the imaging optical system, and guides the other part of the subject light into the sensor; an optical system that is provided between the optical element and the sensor; a temperature detection section that detects a temperature; a focus lens position detection section that detects a position of the focus lens; a storage section that stores data in which the temperature, the position of the focus lens, and information for in-focus position correction are associated with one another; a correction section that corrects the in-focus position of the focus lens based on the detection phase difference, which is the phase difference detected by the phase difference detection section, on the basis of the data which is stored in the storage section, the temperature which is detected by the temperature detection section, and the position of the focus lens which is detected by the focus lens position detection section; and a lens control section that moves the focus lens to the in-focus position which is corrected by the correction section.

In the disclosed focusing control device, the correction section generates the information for in-focus position correction, which corresponds to a combination of the temperature detected by the temperature detection section and the position of the focus lens detected by the focus lens position detection section, on the basis of the data, and corrects the in-focus position by using the generated information.

In the disclosed focusing control device, the information for in-focus position correction is an amount of correction for the phase difference. In addition, the correction section generates the amount of correction for the phase difference, which corresponds to a combination of the temperature detected by the temperature detection section and an estimated lens position which is a position of the focus lens in a state where the focus lens is moved in accordance with the detection phase difference, on the basis of the data, and corrects the detection phase difference by using the generated amount of correction for the phase difference. In addition, the lens control section moves the focus lens on the basis of the detection phase difference, which is corrected by the correction section, in a case where the corrected detection phase difference is greater than a first threshold value.

In the disclosed focusing control device, the information for in-focus position correction is an amount of correction for the phase difference. In addition, assuming that n is a natural number of 1 or more, the correction section performs first processing of calculating an n-th estimated lens position, which is a position of the focus lens in a state where the focus lens is moved in accordance with the detection phase difference, and generating an n-th amount of correction of the phase difference, which corresponds a combination of the n-th estimated lens position and the temperature detected by the temperature detection section, on the basis of the data, and performs second processing of calculating an (n+1)th estimated lens position, which is a position of the focus lens in a state where the focus lens is moved in accordance with the corrected phase difference obtained by correcting the detection phase difference by the n-th amount of correction, and generating the (n+1)th amount of correction for the phase difference, which corresponds to a combination of the (n+1)th estimated lens position and the temperature detected by the temperature detection section, on the basis of the data. In addition, in a case where a difference between the n-th amount of correction and the (n+1)th amount of correction is equal to or less than a second threshold value, the lens control section moves the focus lens on the basis of the detection phase difference which is corrected by the correction section by using the n-th amount of correction or the (n+1)th amount of correction.

In the disclosed focusing control device, on the basis of a result of the second processing, in a case where the difference between the n-th amount of correction and the (n+1)th amount of correction is greater than the second threshold value, the correction section increases n by an increment of 1, and performs the second processing again.

The disclosed focusing control device further comprises a zoom magnification detection section that detects a zoom magnification of a zoom lens. The imaging optical system includes the zoom lens. In addition, in the data of the storage section, the zoom magnification of the zoom lens is further associated with the information for in-focus position correction. In addition, the correction section generates the information for in-focus position correction, on the basis of the data, the temperature detected by the temperature detection section, the zoom magnification detected by the zoom magnification detection section, the position of the focus lens detected by the focus lens position detection section.

In the disclosed focusing control device, the correction section generates the information for in-focus position correction which corresponds to a combination of the temperature detected by the temperature detection section, the zoom magnification detected by the zoom magnification detection section, and the position of the focus lens detected by the focus lens position detection section, on the basis of the data.

In the disclosed focusing control device, the information for in-focus position correction is an amount of correction for the phase difference. In addition, the correction section generates the amount of correction for the phase difference corresponding to a combination of the estimated lens position which is a position of the focus lens in a state where the focus lens is moved in accordance with the detection phase difference, the temperature detected by the temperature detection section, and the zoom magnification detected by the zoom magnification detection section, on the basis of the data, and corrects the detection phase difference by using the generated amount of correction for the phase difference. In addition, the lens control section moves the focus lens on the basis of the detection phase difference, which is corrected by the correction section, in a case where the corrected detection phase difference is greater than a first threshold value.

In the disclosed focusing control device, the information for in-focus position correction is an amount of correction for the phase difference. In addition, the imaging optical system includes a zoom lens. In addition, the focusing control device further comprises a zoom magnification detection section that detects the zoom magnification of the zoom lens. In addition, assuming that n is a natural number of 1 or more, the correction section performs first processing of calculating an n-th estimated lens position, which is a position of the focus lens in a state where the focus lens is moved in accordance with the detection phase difference, and generating an n-th amount of correction of the phase difference, which corresponds a combination of the n-th estimated lens position, the temperature detected by the temperature detection section, and the zoom magnification detected by the zoom magnification detection section, on the basis of the data, and performs second processing of calculating an (n+1)th estimated lens position, which is a position of the focus lens in a state where the focus lens is moved in accordance with the corrected phase difference obtained by correcting the detection phase difference by the n-th amount of correction, and generating the (n+1)th amount of correction for the phase difference, which corresponds to a combination of the (n+1)th estimated lens position, the temperature detected by the temperature detection section, and the zoom magnification detected by the zoom magnification detection section, on the basis of the data. In addition, in a case where a difference between the n-th amount of correction and the (n+1)th amount of correction is equal to or less than a second threshold value, the lens control section moves the focus lens on the basis of the detection phase difference which is corrected by the correction section by using the n-th amount of correction or the (n+1)th amount of correction.

In the disclosed focusing control device, on the basis of a result of the second processing, in a case where the difference between the n-th amount of correction and the (n+1)th amount of correction is greater than the second threshold value, the correction section increases n by an increment of 1, and performs the second processing again.

In the disclosed focusing control device, the storage section further stores differential data about a difference between the information for in-focus position correction designed and included in the data and an actual measurement value of the current information for in-focus position correction. In addition, the correction section generates, as eventual information for in-focus position correction, information obtained by adding the differential data to the information for in-focus position correction which is generated on the basis of the temperature detected by the temperature detection section and the position of the focus lens detected by the focus lens position detection section.

A disclosed lens device comprises: the focusing control device; and the imaging optical system.

A disclosed imaging apparatus comprises: the focusing control device; and the imaging element.

A disclosed focusing control method is performed by a focusing control device included in a lens device which is used with a camera device. The focusing device includes a sensor that outputs a pair of image signals deviated in one direction on the basis of one subject light image, an optical element that guides a part of subject light, which is incident into an imaging optical system including a focus lens, into an imaging element which captures a subject light image through the imaging optical system, and guides the other part of the subject light into the sensor, an optical system that is provided between the optical element and the sensor, a temperature detection section that detects a temperature, and a storage section that stores data in which the temperature, the position of the focus lens, and information for in-focus position correction are associated with one another. The focusing control method comprises: a phase difference detection step of detecting a phase difference between the pair of image signals which are output from the sensor; a focus lens position detection step of detecting a position of the focus lens; a correction step of correcting the in-focus position of the focus lens based on the detection phase difference, which is the phase difference detected in the phase difference detection step, on the basis of the data which is stored in the storage section, the temperature which is detected by the temperature detection section, and the position of the focus lens which is detected in the focus lens position detection step; and a lens control step of moving the focus lens to the in-focus position which is corrected in the correction step.

In the disclosed focusing control method, in the correction step, the information for in-focus position correction, which corresponds to a combination of the temperature detected by the temperature detection section and the position of the focus lens detected in the focus lens position detection step, is generated on the basis of the data, and the in-focus position is corrected by using the generated information.

In the disclosed focusing control method, the information for in-focus position connection is an amount of correction for the phase difference. In addition, in the correction step, the amount of correction for the phase difference, which corresponds to a combination of the temperature detected by the temperature detection section and an estimated lens position which is a position of the focus lens in a state where the focus lens is moved in accordance with the detection phase difference, is generated on the basis of the data, and the detection phase difference is corrected by using the generated amount of correction for the phase difference. In addition, in the lens control step, the focus lens is moved on the basis of the detection phase difference, which is corrected in the correction step, in a case where the corrected detection phase difference is greater than a first threshold value.

In the disclosed focusing control method, the information for in-focus position correction is an amount of correction for the phase difference. In addition, assuming that n is a natural number of 1 or more, in the correction step, first processing of calculating an n-th estimated lens position, which is a position of the focus lens in a state where the focus lens is moved in accordance with the detection phase difference, and generating an n-th amount of correction of the phase difference, which corresponds a combination of the n-th estimated lens position and the temperature detected by the temperature detection section, is performed on the basis of the data, and second processing of calculating an (n+1)th estimated lens position, which is a position of the focus lens in a state where the focus lens is moved in accordance with the corrected phase difference obtained by correcting the detection phase difference by the n-th amount of correction, and generating the (n+1)th amount of correction for the phase difference, which corresponds to a combination of the (n+1)th estimated lens position and the temperature detected by the temperature detection section, is performed on the basis of the data. In addition, in the lens control step, in a case where a difference between the n-th amount of correction and the (n+1)th amount of correction is equal to or less than a second threshold value, the focus lens is moved on the basis of the detection phase difference which is corrected in the correction step by using the n-th amount of correction or the (n+1)th amount of correction.

In the disclosed focusing control method, in the correction step, on the basis of a result of the second processing, in a case where the difference between the n-th amount of correction and the (n+1)th amount of correction is greater than the second threshold value, n is increased by an increment of 1, and the second processing is performed again.

The disclosed focusing control method further comprises a zoom magnification detection step of detecting a zoom magnification of a zoom lens. The imaging optical system includes the zoom lens. In addition, in the data of the storage section, the zoom magnification of the zoom lens is further associated with the information for in-focus position correction. In addition, in the correction step, the information for in-focus position correction is generated on the basis of the data, the temperature detected by the temperature detection section, the zoom magnification detected in the zoom magnification detection step, the position of the focus lens detected in the focus lens position detection step.

In the disclosed focusing control method, in the correction step, the information for in-focus position correction, which corresponds to a combination of the temperature detected by the temperature detection section, the zoom magnification detected in the zoom magnification detection step, and the position of the focus lens detected in the focus lens position detection step, is generated on the basis of the data.

In the disclosed focusing control method, the information for in-focus position correction is an amount of correction for the phase difference. In addition, in the correction step, the amount of correction for the phase difference corresponding to a combination of the estimated lens position, which is a position of the focus lens in a state where the focus lens is moved in accordance with the detection phase difference, the temperature detected by the temperature detection section, and the zoom magnification detected in the zoom magnification detection step, is generated on the basis of the data, and corrects the detection phase difference by using the generated amount of correction for the phase difference. In addition, in the lens control step, the focus lens is moved on the basis of the detection phase difference, which is corrected in the correction step, in a case where the corrected detection phase difference is greater than a first threshold value.

The disclosed focusing control method further comprises a zoom magnification detection step of detecting a zoom magnification of a zoom lens. The information for in-focus position correction is an amount of correction for the phase difference. In addition, the imaging optical system includes the zoom lens. In addition, assuming that n is a natural number of 1 or more, in the correction step, first processing of calculating an n-th estimated lens position, which is a position of the focus lens in a state where the focus lens is moved in accordance with the detection phase difference, and generating an n-th amount of correction of the phase difference, which corresponds a combination of the n-th estimated lens position, the temperature detected by the temperature detection section, and the zoom magnification detected in the zoom magnification detection step, is performed on the basis of the data, and second processing of calculating an (n+1)th estimated lens position, which is a position of the focus lens in a state where the focus lens is moved in accordance with the corrected phase difference obtained by correcting the detection phase difference by the n-th amount of correction, and generating the (n+1)th amount of correction for the phase difference, which corresponds to a combination of the (n+1)th estimated lens position, the temperature detected by the temperature detection section, and the zoom magnification detected in the zoom magnification detection step, is performed on the basis of the data. In addition, in the lens control step, in a case where a difference between the n-th amount of correction and the (n+1)th amount of correction is equal to or less than a second threshold value, the focus lens is moved on the basis of the detection phase difference which is corrected in the correction step by using the n-th amount of correction or the (n+1)th amount of correction.

In the disclosed focusing control method, in the correction step, on the basis of a result of the second processing, in a case where the difference between the n-th amount of correction and the (n+1)th amount of correction is greater than the second threshold value, n is increased by an increment of 1, and the second processing is performed again.

In the disclosed focusing control method, the storage section further stores differential data about a difference between the information for in-focus position correction designed and included in the data and an actual measurement value of the current information for in-focus position correction. In addition, in the correction step, information obtained by adding the differential data to the information for in-focus position correction, which is generated on the basis of the temperature detected by the temperature detection section and the position of the focus lens detected in the focus lens position detection step, is generated as eventual information for in-focus position correction.

A disclosed non-transitory computer readable recording medium storing a focusing control program is for performing focusing control for the focus lens through a focusing control device included in a lens device which is used with a camera device. The focusing control device includes a sensor that outputs a pair of image signals deviated in one direction on the basis of one subject light image, an optical element that guides a part of subject light, which is incident into an imaging optical system including a focus lens, into an imaging element which captures a subject light image through the imaging optical system, and guides the other part of the subject light into the sensor, an optical system that is provided between the optical element and the sensor, a temperature detection section that detects a temperature, and a storage section that stores data in which the temperature, the position of the focus lens, and information for in-focus position correction are associated with one another. The stored focusing control program causes a computer to execute: a phase difference detection step of detecting a phase difference between the pair of image signals which are output from the sensor; a focus lens position detection step of detecting a position of the focus lens; a correction step of correcting the in-focus position of the focus lens based on the detection phase difference, which is the phase difference detected in the phase difference detection step, on the basis of the data which is stored in the storage section, the temperature which is detected by the temperature detection section, and the position of the focus lens which is detected in the focus lens position detection step; and a lens control step of moving the focus lens to the in-focus position which is corrected in the correction step.

In particular, the present invention can be applied to business camera systems for which high-precision focusing control is required, and is thus highly convenient and effective.

EXPLANATION OF REFERENCES

1: lens device
10: temperature detection section
11: focus lens
12, 13: zoom lens
16: beam splitter
17: mirror
18: condensing lens
19: separator lens 20: imaging element
26: control section
26A: phase difference detection section
26B: correction section
26C: lens control section
27: storage section
3: camera apparatus
31: imaging element

What is claimed is:

1. A focusing control device, included in a lens device which is used with a camera device, comprising:
   a sensor that outputs a pair of image signals deviated in one direction on the basis of one subject light image;
   a phase difference detection section that detects a phase difference between the pair of image signals which are output from the sensor;
   an optical element that guides a part of subject light, which is incident into an imaging optical system including a focus lens, into an imaging element which captures a subject light image through the imaging optical system, and guides the other part of the subject light into the sensor;
   an optical system that is provided between the optical element and the sensor;
   a temperature detection section that detects a temperature;
   a focus lens position detection section that detects a position of the focus lens;
   a storage section that stores data in which the temperature, the position of the focus lens, and information for in-focus position correction are associated with one another;
   a correction section that corrects the in-focus position of the focus lens based on the detection phase difference, which is the phase difference detected by the phase difference detection section, on the basis of the data which is stored in the storage section, the temperature which is detected by the temperature detection section, and the position of the focus lens which is detected by the focus lens position detection section; and
   a lens control section that moves the focus lens to the in-focus position which is corrected by the correction section.

2. The focusing control device according to claim 1, wherein the information for in-focus position correction is an amount of correction for the phase difference,
   wherein the correction section generates the amount of correction for the phase difference, which corresponds to a combination of the temperature detected by the temperature detection section and an estimated lens position which is a position of the focus lens in a state where the focus lens is moved in accordance with the detection phase difference, on the basis of the data, and corrects the detection phase difference by using the generated amount of correction for the phase difference, and
   wherein the lens control section moves the focus lens on the basis of the detection phase difference, which is corrected by the correction section, in a case where the corrected detection phase difference is greater than a first threshold value.

3. The focusing control device according to claim 1, wherein the information for in-focus position correction is an amount of correction for the phase difference,
   wherein assuming that n is a natural number of 1 or more, the correction section performs first processing of calculating an n-th estimated lens position, which is a position of the focus lens in a state where the focus lens is moved in accordance with the detection phase difference, and generating an n-th amount of correction of the phase difference, which corresponds a combination of the n-th estimated lens position and the temperature detected by the temperature detection section, on the basis of the data, and performs second processing of calculating an (n+1)th estimated lens position, which is a position of the focus lens in a state where the focus lens is moved in accordance with the corrected phase difference obtained by correcting the detection phase difference by the n-th amount of correction, and generating the (n+1)th amount of correction for the phase difference, which corresponds to a combination of the (n+1)th estimated lens position and the temperature detected by the temperature detection section, on the basis of the data, and
   wherein in a case where a difference between the n-th amount of correction and the (n+1)th amount of correction is equal to or less than a second threshold value, the lens control section moves the focus lens on the basis of the detection phase difference which is corrected by the correction section by using the n-th amount of correction or the (n+1)th amount of correction.

4. The focusing control device according to claim 3, wherein on the basis of a result of the second processing, in a case where the difference between the n-th amount of correction and the (n+1)th amount of correction is greater than the second threshold value, the correction section increases n by an increment of 1, and performs the second processing again.

5. The focusing control device according to claim 1, wherein the imaging optical system includes a zoom lens,
   wherein in the data of the storage section, the zoom magnification of the zoom lens is further associated with the information for in-focus position correction,
   wherein the focusing control device further comprises a zoom magnification detection section that detects the zoom magnification of the zoom lens, and
   wherein the correction section generates the information for in-focus position correction, on the basis of the data, the temperature detected by the temperature detection section, the zoom magnification detected by the zoom magnification detection section, the position of the focus lens detected by the focus lens position detection section.

6. The focusing control device according to claim 5, wherein the correction section generates the information for in-focus position correction which corresponds to a combination of the temperature detected by the temperature detection section, the zoom magnification detected by the zoom magnification detection section, and the position of the focus lens detected by the focus lens position detection section, on the basis of the data.

7. The focusing control device according to claim 5, wherein the information for in-focus position correction is an amount of correction for the phase difference,
   wherein the correction section generates the amount of correction for the phase difference corresponding to a combination of the estimated lens position which is a position of the focus lens in a state where the focus lens is moved in accordance with the detection phase difference, the temperature detected by the temperature detection section, and the zoom magnification detected by the zoom magnification detection section, on the basis of the data, and corrects the detection phase difference by using the generated amount of correction for the phase difference, and wherein the lens control section moves the focus lens on the basis of the detection phase difference, which is corrected by the correction section, in a case where the corrected detection phase difference is greater than a first threshold value.

8. The focusing control device according to claim 1, wherein the information for in-focus position correction is an amount of correction for the phase difference, wherein the imaging optical system includes a zoom lens, wherein the focusing control device further comprises a zoom magnification detection section that detects the zoom magnification of the zoom lens, wherein assuming that n is a natural number of 1 or more, the correction section performs first processing of calculating an n-th estimated lens position, which is a position of the focus lens in a state where the focus lens is moved in accordance with the detection phase difference, and generating an n-th amount of correction of the phase difference, which corresponds a combination of the n-th estimated lens position, the temperature detected by the temperature detection section, and the zoom magnification detected by the zoom magnification detection section, on the basis of the data, and performs second processing of calculating an (n+1)th estimated lens position, which is a position of the focus lens in a state where the focus lens is moved in accordance with the corrected phase difference obtained by correcting the detection phase difference by the n-th amount of correction, and generating the (n+1)th amount of correction for the phase difference, which corresponds to a combination of the (n+1)th estimated lens position, the temperature detected by the temperature detection section, and the zoom magnification detected by the zoom magnification detection section, on the basis of the data, and wherein in a case where a difference between the n-th amount of correction and the (n+1)th amount of correction is equal to or less than a second threshold value, the lens control section moves the focus lens on the basis of the detection phase difference which is corrected by the correction section by using the n-th amount of correction or the (n+1)th amount of correction.

9. The focusing control device according to claim 8, wherein on the basis of a result of the second processing, in a case where the difference between the n-th amount of correction and the (n+1)th amount of correction is greater than the second threshold value, the correction section increases n by an increment of 1, and performs the second processing again.

10. The focusing control device according to claim 1, wherein the storage section further stores differential data about a difference between the information for in-focus position correction designed and included in the data and an actual measurement value of the current information for in-focus position correction, and wherein the correction section generates, as eventual information for in-focus position correction, information obtained by adding the differential data to the information for in-focus position correction which is generated on the basis of the temperature detected by the temperature detection section and the position of the focus lens detected by the focus lens position detection section.

11. A focusing control method that is performed by the focusing control device according to claim 1 including the sensor that outputs a pair of image signals deviated in one direction on the basis of one subject light image, the optical element that guides a part of subject light, which is incident into the imaging optical system including a focus lens, into the imaging element which captures a subject light image through the imaging optical system, and guides the other part of the subject light into the sensor, the optical system that is provided between the optical element and the sensor, the temperature detection section that detects a temperature, and the storage section that stores data in which the temperature, the position of the focus lens, and information for in-focus position correction are associated with one another, the focusing control method comprising:

a phase difference detection step of detecting a phase difference between the pair of image signals which are output from the sensor;

a focus lens position detection step of detecting a position of the focus lens;

a correction step of correcting the in-focus position of the focus lens based on the detection phase difference, which is the phase difference detected in the phase difference detection step, on the basis of the data which is stored in the storage section, the temperature which is detected by the temperature detection section, and the position of the focus lens which is detected in the focus lens position detection step; and a lens control step of moving the focus lens to the in-focus position which is corrected in the correction step.

12. The focusing control method according to claim 11, wherein the information for in-focus position correction is an amount of correction for the phase difference, wherein in the correction step, the amount of correction for the phase difference, which corresponds to a combination of the temperature detected by the temperature detection section and an estimated lens position which is a position of the focus lens in a state where the focus lens is moved in accordance with the detection phase difference, is generated on the basis of the data, and the detection phase difference is corrected by using the generated amount of correction for the phase difference, and wherein in the lens control step, the focus lens is moved on the basis of the detection phase difference, which is corrected in the correction step, in a case where the corrected detection phase difference is greater than a first threshold value.

13. The focusing control method according to claim 11, wherein the information for in-focus position correction is an amount of correction for the phase difference, wherein assuming that n is a natural number of 1 or more, in the correction step, first processing of calculating an n-th estimated lens position, which is a position of the focus lens in a state where the focus lens is moved in accordance with the detection phase difference, and generating an n-th amount of correction of the phase difference, which corresponds a combination of the n-th estimated lens position and the temperature detected by the temperature detection section, is performed on the basis of the data, and second processing of calculating an (n+1)th estimated lens position, which is a position of the focus lens in a state where the focus lens is moved in accordance with the corrected phase difference obtained by correcting the detection phase difference by the n-th amount of correction, and generating the (n+1)th amount of correction for the phase difference, which corresponds to a combination of the (n+1)th estimated lens position and the temperature detected by the temperature detection section, is performed on the basis of the data, and wherein in the lens control step, in a case where a difference between the n-th amount of correction and the (n+1)th amount of correction is equal to or less than a second threshold value, the focus lens is moved on the basis of the detection phase difference which is corrected in the correction step by using the n-th amount of correction or the (n+1)th amount of correction.

14. The focusing control method according to claim 13, wherein in the correction step, on the basis of a result of the second processing, in a case where the difference between the n-th amount of correction and the (n+1)th amount of correction is greater than the second threshold value, n is increased by an increment of 1, and the second processing is performed again.

15. The focusing control method according to claim 11, wherein the imaging optical system includes a zoom lens, wherein in the data of the storage section, the zoom magnification of the zoom lens is further associated with the information for in-focus position correction, wherein the focusing control method further comprises a zoom magnification detection step of detecting the zoom magnification of the zoom lens, and wherein in the correction step, the information for in-focus position correction is generated on the basis of the data, the temperature detected by the temperature detection section, the zoom magnification detected in the zoom magnification detection step, the position of the focus lens detected in the focus lens position detection step.

16. The focusing control method according to claim 15, wherein the information for in-focus position correction is an amount of correction for the phase difference, wherein in the correction step, the amount of correction for the phase difference corresponding to a combination of the estimated lens position, which is a position of the focus lens in a state where the focus lens is moved in accordance with the detection phase difference, the temperature detected by the temperature detection section, and the zoom magnification detected in the zoom magnification detection step, is generated on the basis of the data, and corrects the detection phase difference by using the generated amount of correction for the phase difference, and wherein in the lens control step, the focus lens is moved on the basis of the detection phase difference, which is corrected in the correction step, in a case where the corrected detection phase difference is greater than a first threshold value.

17. The focusing control method according to claim 11, further comprising a zoom magnification detection step of detecting a zoom magnification of a zoom lens, wherein the information for in-focus position correction is an amount of correction for the phase difference, wherein the imaging optical system includes the zoom lens, wherein assuming that n is a natural number of 1 or more, in the correction step, first processing of calculating an n-th estimated lens position, which is a position of the focus lens in a state where the focus lens is moved in accordance with the detection phase difference, and generating an n-th amount of correction of the phase difference, which corresponds a combination of the n-th estimated lens position, the temperature detected by the temperature detection section, and the zoom magnification detected in the zoom magnification detection step, is performed on the basis of the data, and second processing of calculating an (n+1)th estimated lens position, which is a position of the focus lens in a state where the focus lens is moved in accordance with the corrected phase difference obtained by correcting the detection phase difference by the n-th amount of correction, and generating the (n+1)th amount of correction for the phase difference, which corresponds to a combination of the (n+1)th estimated lens position, the temperature detected by the temperature detection section, and the zoom magnification detected in the zoom magnification detection step, is performed on the basis of the data, and wherein in the lens control step, in a case where a difference between the n-th amount of correction and the (n+1)th amount of correction is equal to or less than a second threshold value, the focus lens is moved on the basis of the detection phase difference which is corrected in the correction step by using the n-th amount of correction or the (n+1)th amount of correction.

18. The focusing control method according to claim 17, wherein in the correction step, on the basis of a result of the second processing, in a case where the difference between the n-th amount of correction and the (n+1)th amount of correction is greater than the second threshold value, n is increased by an increment of 1, and the second processing is performed again.

19. The focusing control method according to claim 11, wherein the storage section further stores differential data about a difference between the information for in-focus position correction designed and included in the data and an actual measurement value of the current information for in-focus position correction, and wherein in the correction step, information obtained by adding the differential data to the information for in-focus position correction, which is generated on the basis of the temperature detected by the temperature detection section and the position of the focus lens detected in the focus lens position detection step, is generated as eventual information for in-focus position correction.

20. A non-transitory computer readable recording medium storing a focusing control program for performing focusing control for the focus lens through the focusing control device according to claim 1 including the sensor that outputs a pair of image signals deviated in one direction on the basis of one subject light image, the optical element that guides a part of subject light, which is incident into the imaging optical system including the focus lens, into an imaging element which captures a subject light image through the imaging optical system, and guides the other part of the subject light into the sensor, the optical system that is provided between the optical element and the sensor, the temperature detection section that detects a temperature, and the storage section that stores data in which the temperature, the position of the focus lens, and information for in-focus position correction are associated with one another, the stored focusing control program causing a computer to execute:

a phase difference detection step of detecting a phase difference between the pair of image signals which are output from the sensor;

a focus lens position detection step of detecting a position of the focus lens;

a correction step of correcting the in-focus position of the focus lens based on the detection phase difference, which is the phase difference detected in the phase difference detection step, on the basis of the data which is stored in the storage section, the temperature which is detected by the temperature detection section, and the position of the focus lens which is detected in the focus lens position detection step; and a lens control step of moving the focus lens to the in-focus position which is corrected in the correction step.

* * * * *